United States Patent [19]

Jachimowicz et al.

[11] Patent Number: 5,224,198
[45] Date of Patent: Jun. 29, 1993

[54] WAVEGUIDE VIRTUAL IMAGE DISPLAY

[75] Inventors: Karen E. Jachimowicz, Goodyear; Fred V. Richard; Ronald J. Nelson, both of Scottsdale, all of Ariz.

[73] Assignee: Motorola, Inc., Schaumburg, Ill.

[21] Appl. No.: 767,180

[22] Filed: Sep. 30, 1991

[51] Int. Cl.⁵ ............................................. G02B 6/00
[52] U.S. Cl. ................................... 385/133; 385/146; 385/147; 359/13; 359/15
[58] Field of Search .................. 359/13, 15, 572, 566, 359/630; 385/133, 146, 147

[56] References Cited

U.S. PATENT DOCUMENTS 4,869,575  9/1989  Kubick .......................... 359/630
5,000,544  3/1991  Staveley ........................ 359/630

Primary Examiner—Brian Healy
Assistant Examiner—S. W. Barns

[57] ABSTRACT

A waveguide virtual image display including image generation apparatus providing a real image at an inlet of an optical waveguide. The real image being reflected a plurality of times within the optical waveguide by diffractive optical elements that magnify and filter the real image and produce a virtual image at a viewing aperture. The display is mounted on an eyeglasses frame for hands-free viewing.

12 Claims, 5 Drawing Sheets

WAVEGUIDE VIRTUAL IMAGE DISPLAY

The present invention pertains to virtual image displays and more particularly to compact virtual image displays.

BACKGROUND OF THE INVENTION

Visual displays are utilized in a great variety of equipment at the present time. The problem is that visual displays require relatively high electrical power and require a great amount of area to be sufficiently large to produce a useful display. In the prior art, for example, it is common to provide visual displays utilizing liquid crystal displays, directly viewed light emitting diodes, etc. These produce very large and cumbersome displays that greatly increase the size of the receiver and require relatively large amounts of power.

In one instance, the prior art includes a scanning mirror which periodically scans a single row of pixels to produce a two dimensional visual display but again this requires relatively large amounts of power and is very complicated and sensitive to shock. Also, the scanning mirror causes vibration in the unit which substantially reduces visual acuity.

SUMMARY OF THE INVENTION

It is an object of the present invention to provide a new and improved waveguide virtual image display.

It is a further object of the present invention to provide a new and improved waveguide virtual image display which is compact, rugged, substantially decreases light loss and improves magnification.

It is a further object of the present invention to provide a new and improved waveguide virtual image display having a variety of filtering capabilities.

These and other objects and advantages are realized in a waveguide virtual image display having a viewing aperture, the display including image generation apparatus for providing a real image, an optical waveguide having an inlet positioned adjacent the image generation apparatus for receiving a real image provided thereby and an outlet spaced from the inlet and defining the viewing aperture, the optical waveguide defining an optical path therethrough from the inlet to the outlet and constructed to transmit an image from the inlet to the outlet, and optical means positioned along the optical waveguide at predetermined areas in the optical path for magnifying a real image supplied at the inlet and providing a magnified virtual image at the outlet.

BRIEF DESCRIPTION OF THE DRAWINGS

Referring to the drawings.

DESCRIPTION OF THE PREFERRED EMBODIMENT

Figure 1A:
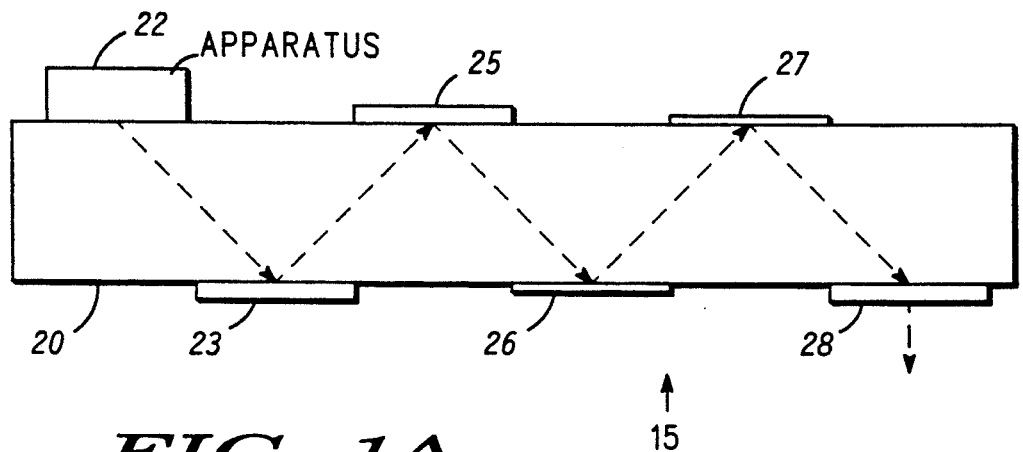
FIGS. 1A and 1B are side and top plan views of a waveguide virtual image display embodying the present invention.
Figure 1B:
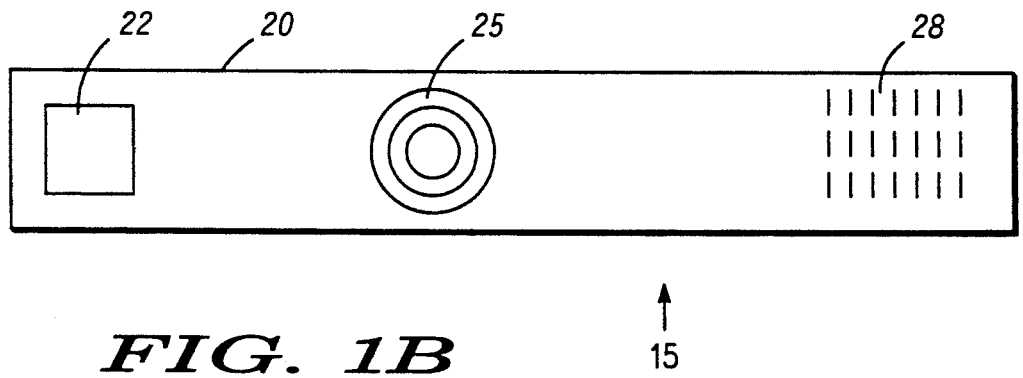

Referring specifically to FIGS. 1A and 1B, a waveguide virtual image display 15 is illustrated in side and top views thereof, respectively. Display 15 includes an optical waveguide 20. The term "waveguide" as used in this disclosure denotes total internal reflection confinement in a relatively thick substrate. This is opposed to the more conventional usage in which light is confined to a very thin layer in which only discrete waveguide modes can propagate. Optical waveguide 20 has image generation apparatus 22 affixed thereto adjacent one end for providing a real image at a real image inlet. The real image from apparatus 22 is directed angularly along optical waveguide 20 toward a diffractive magnifying lens 23. Diffractive magnifying lens 23 is any of the well known lenses, similar in operation to a Fresnel lens, which are presently producible. As is known in the art, diffractive lenses utilizing the Fresnel principal, binary optics, etc. are producible utilizing well known semiconductor manufacturing techniques. Such lenses are conveniently patterned to provide a desired amount of magnification.

Light rays from the real image at apparatus 22 are diffracted by lens 23 onto a second lens 25 where additional magnification occurs. The light rays are then directed along a light path through optical waveguide 20, being reflected at predetermined areas 26 and 27, until the light rays exit optical waveguide 20 at a virtual image outlet. Depending on the optical properties required of display 20, areas 26 and/or 27 may include additional diffractive optical elements, providing additional optical power, filtering, aberration correction, etc. Diffractive grating 28 defines a viewing aperture, through which an operator looks to view an enlarged virtual image of the real image produced by apparatus 22.

Figure 2:
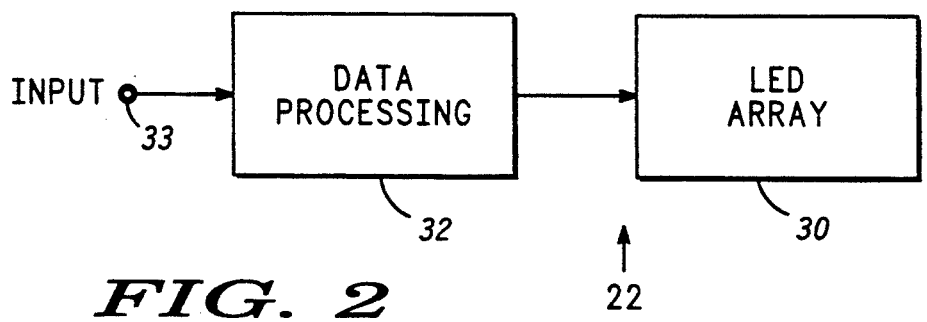
FIG. 2 is a simplified block diagram of an electronic portion of the waveguide virtual image display of FIG. 1.

Apparatus 22 is illustrated in more detail in FIG. 2 and includes, for example, semiconductor electronics such as a light emitting diode (LED) array 30 driven by data processing circuits 32. Data processing circuits 32 include, for example, logic and switching circuit arrays for controlling each LED in LED array 30. Data processing circuits 32 include, in addition to or instead of the logic and switching arrays, a microprocessor or similar circuitry for processing input signals to produce a desired real image on a device such as LED array 30.

Figure 3:
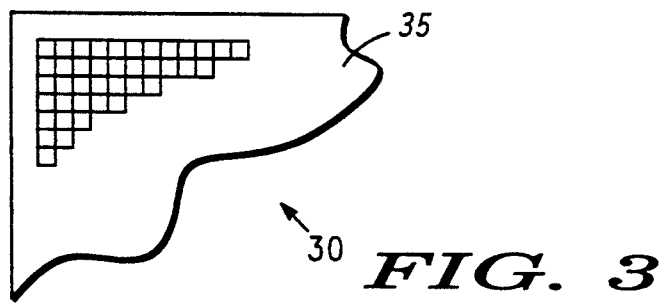
FIG. 3 is a view in top plan of the LED array of FIG. 2.

In this specific embodiment LED array 30 is utilized because of the extremely small size that can be achieved and because of the simplicity of construction and operation. It will of course be understood that other image generating devices may be utilized, including but not limited to lasers, LCDs, CRTs, etc. Referring specifically to FIG. 3, a plan view of LED array 30 is illustrated in which pixels are formed in a regular pattern of rows and columns on a single semiconductor chip 35. Each pixel includes at least one LED, with additional parallel LEDs being included, if desired, for additional brightness and redundancy. By addressing specific pixels by row and column in a well known manner, the specific pixels are energized to produce a real image. Digital or analog data is received at an input terminal 33 and converted by data processing circuits 32 into signals capable of energizing selected pixels to generate the predetermined real image.

It will be understood by those skilled in the art that LED array 30 and semiconductor chip 35 are greatly enlarged in the FIGS. The actual size of semiconductor chip 35 is on the order of a few milli-meters along each side with each LED being on the order of as little as one micron on a side. As the semiconductor technology reduces the size of the chip, greater magnification and smaller lens systems are required. Because the long optical path (multiple reflections) in the optical waveguide allows for greatly increased focal lengths of the diffractive elements or lenses without substantially increasing the overall size of the display, relatively high magnification can be achieved without greatly limiting the field of view or substantially reducing eye relief.

Figure 4:
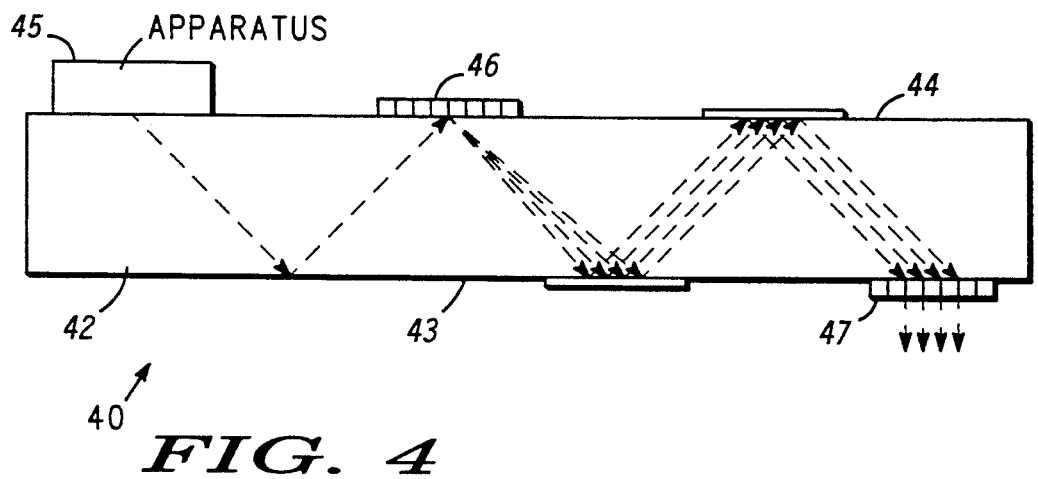
FIGS. 4 through 9 are side views of other waveguide virtual image displays, each embodying the present invention.

Referring specifically to FIG. 4, another embodiment of a waveguide image display, which display is designated 40, is illustrated. Display 40 includes an optical waveguide 42 having parallel spaced apart surfaces 43 and 44 with image generating apparatus 45 affixed thereto at a real image inlet. Apparatus 45 is basically the same as apparatus 22, explained above, and provides a real image which is transmitted along an optical path through optical waveguide 42 to a virtual image outlet. The real image is introduced into optical waveguide 42 angularly so as to reflect a plurality of times from the spaced apart parallel sides 43 and 44, at predetermined areas, and eventually appear at a virtual image outlet as a magnified virtual image. It should be understood that the general term "reflect" is utilized to include any manner in which the angularly directed light rays are redirected from an area at one of the parallel surfaces 43 or 44 back into the bulk of optical waveguide 42.

In display 40, light rays from the real image at apparatus 45 are reflected a first time from side 43 and directed back toward a predetermined area on side 44 where a diffraction grating 46 is affixed. Diffraction grating 46 is constructed to diffract the light into a plurality of paths. The diffracted light is reflected twice more at predetermined areas on sides 43 and 44, respectively, and then appears as a virtual image at an outlet defined by a second diffractive grating 47. Diffractive gratings 46 and 47 are designed to cooperate and generally operate as a low pass filter which removes such undesirable light as pixellation noise and the like. Further, the low pass filtering action smooths the image and produces a more desirable virtual image at the viewing aperture defined by diffractive grating 47.

Figure 5:
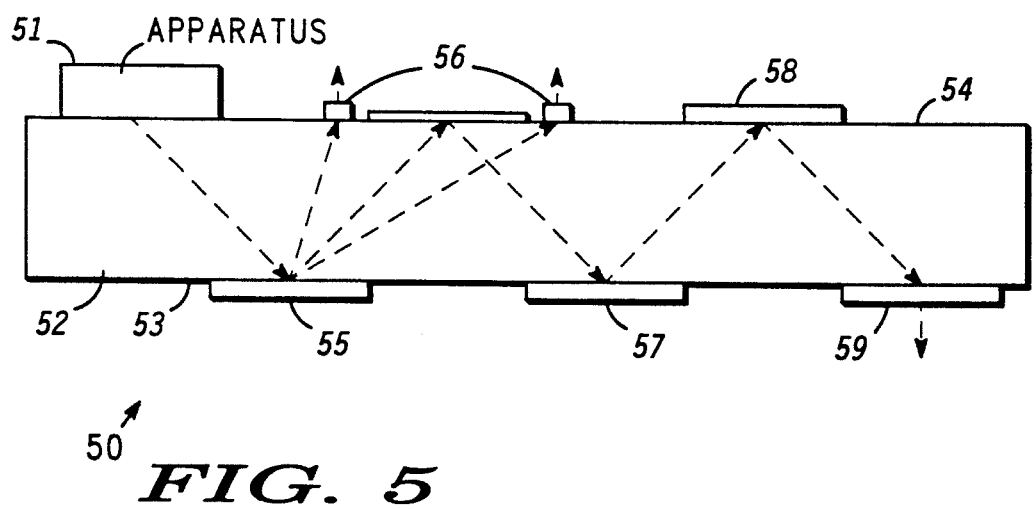

Referring specifically to FIG. 5, another embodiment of a waveguide virtual image display 50 is illustrated wherein apparatus 51 is affixed to the inlet of a waveguide 52 for providing a real image thereto. Light rays from the real image at apparatus 51 are directed angularly toward a predetermined area on a first side 53 where they are reflected back toward a second side 54 generally along an optical path defined by sides 53 and 54. A diffractive Fourier lens is affixed to side 53 at the first predetermined area and causes the light rays to be spread so that lines between pixels, which form the real image in apparatus 51, and other undesirable noise is reflected into light absorption or transmission material 56. Material 56 is affixed to side 54 of optical waveguide 52 and either absorbs light impinging thereon or transmits the light out of optical waveguide 52. The remaining portions of the image (light rays) are reflected back to side 53 where a second diffractive lens 57 is positioned which, in combination with another diffractive lens 58 positioned at side 54, completes the magnification of the image. The resulting image is reflected to the outlet of optical waveguide 52 and a final diffractive grating 59 for any additional filtering and aberration correction that may be required. Diffractive grating 59 defines a virtual image aperture through which an operator views an enlarged virtual image of the real image produced by apparatus 51.

Figure 6:
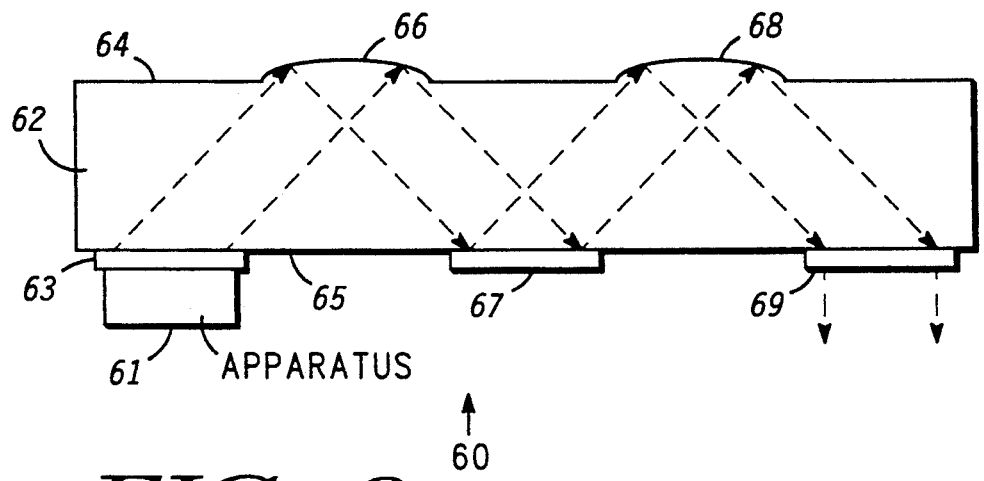

Referring specifically to FIG. 6, another embodiment of a waveguide virtual image display 60 is illustrated wherein apparatus 61 is affixed to the inlet of a waveguide 62 for providing a real image thereto. Light rays from the real image at apparatus 61 are directed angularly, by means of a redirection optical element 63 positioned between apparatus 61 and the inlet of optical waveguide 62, toward a predetermined area on a first side 64 where they are reflected back toward a second side 65 generally along an optical path defined by sides 64 and 65. Redirection element 63 may use any of a number of optical means to redirect light, including but not limited to diffraction, refraction, fiberoptics, etc. A first imaging mirror 66 is formed integrally with optical waveguide 62 at the first predetermined area and provides magnification. A diffractive optical element 67 is affixed to side 65 at the second predetermined area and provides aberration correction on the light rays impinging thereon A second imaging mirror 68 is formed integrally with optical waveguide 62 at the third predetermined area and provides any additional magnification which is required. A final diffractive optical element 69 is positioned along optical waveguide 62 at the outlet and cooperates with element 67 to complete the aberration correction Element 69 defines a viewing aperture through which an operator views a magnified and aberration corrected virtual image.

It will of course be understood that optical waveguide 62 and other optical waveguides disclosed herein are constructed of optical quality quartz, optical quality plastic, or any other of the materials well known and available for the purpose. Further, the various lenses and diffraction gratings described herein are manufactured individually and attached to the waveguide surface, manufactured integrally with the waveguide in a single piece, or some preferred combination of the two. For example, the waveguide can be formed by molding the body out of optical quality plastic and the various diffractive optical elements can be made by embossing a master into a soft polymer film which is then attached to the surface of the optical waveguide. Alternatively, the surface of an optical waveguide formed of optical quality quartz can be processed (etched, deposits, etc) by known semiconductor techniques to provide the desired diffraction and/or reflection characteristics.

Figure 7:
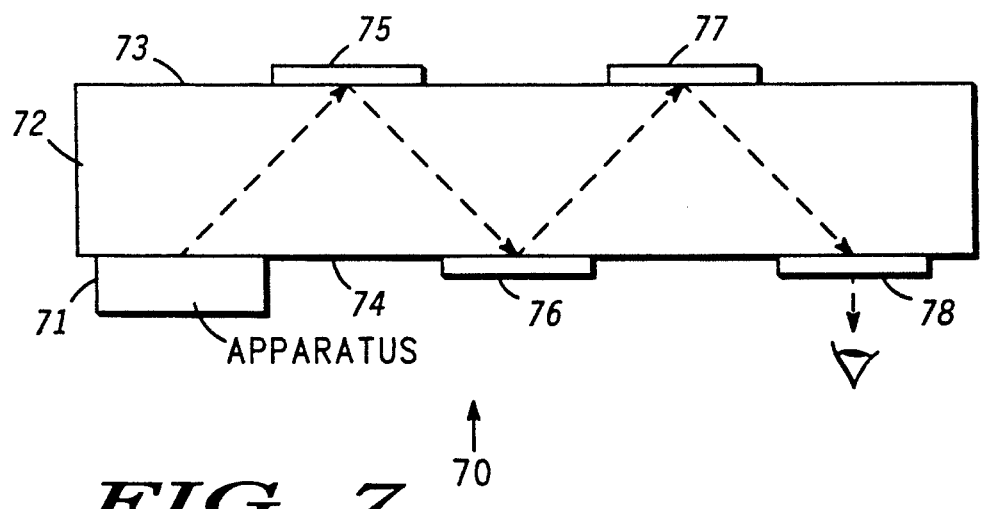

Referring specifically to FIG. 7, another embodiment of a waveguide virtual image display 70 is illustrated wherein apparatus 71 is affixed to the inlet of a waveguide 72 for providing a real image thereto. Light rays from the real image at apparatus 71 are directed angularly toward a predetermined area on a first side 73 where they are reflected back toward a second side 74 generally along an optical path defined by sides 73 and 74. Three diffractive lenses 75, 76 and 77 are affixed to sides 73 and 74 at the next three predetermined areas, respectively, to which the reflected light rays are directed. Diffractive lenses 75, 76, and 77 provide the required amount of magnification so that a virtual image of a desired size is viewable through a last diffractive element 78 which defines the outlet of optical waveguide 72.

Figure 8:
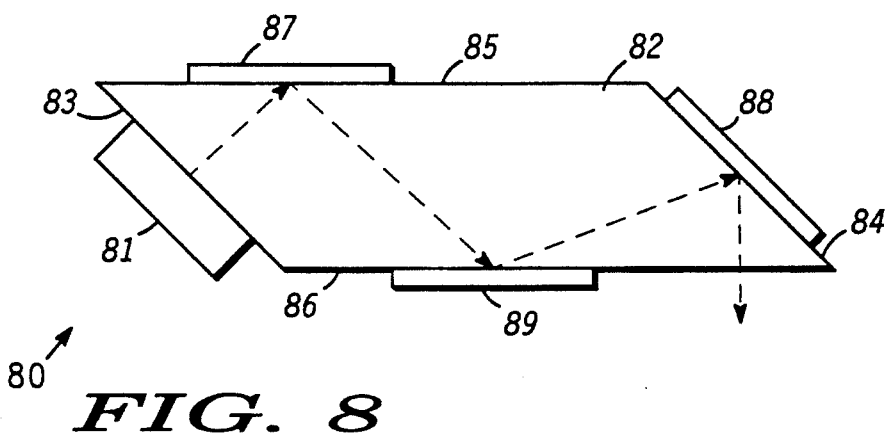

Referring specifically to FIG. 8, another embodiment of a waveguide virtual image display 80 is illustrated wherein apparatus 81 is affixed to the inlet of a waveguide 82 for providing a real image thereto. Waveguide 82 is formed generally in the shape of a parallelogram (side view) with opposite sides, 83, 84 and 85, 86, equal and parallel but not perpendicular to adjacent sides. Side 83 defines the inlet and directs light rays from the real image at apparatus 81 onto a predetermined area on adjacent side 85 generally along an optical path defined by all four sides. Three diffractive lenses 87, 88 and 89 are affixed to adjacent sides 85, 84 and 86, respectively, at three predetermined areas and the magnified virtual image is viewable at an outlet in side 86. This particular embodiment illustrates a display in which the overall size is reduced somewhat and the amount of material in the waveguide is reduced to reduce weight and material utilized.

Figure 9:
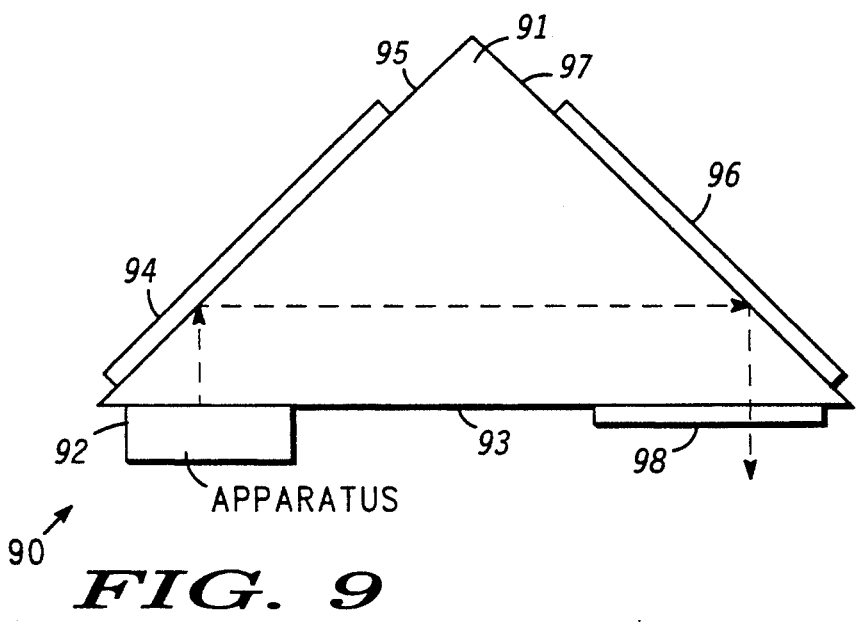

Referring to FIG. 9, yet another embodiment of a waveguide virtual display 90 is illustrated wherein an optical waveguide 91 having a generally triangular shape in side elevation is utilized. An apparatus 92 for producing a real image is affixed to a first side 93 of optical waveguide 91 and emanates light rays which travel along an optical path directly to a diffractive lens 94 affixed to a second side 95. Light rays are reflected from lens 94 to a diffractive lens 96 mounted on a third side 97. Lens 96 in turn reflects the light rays through a final diffractive lens 98 affixed to the outlet of optical waveguide 91 in side 93, which lens 98 defines a viewing aperture for display 90. In this particular embodiment the sides are angularly positioned relative to each other so that the inlet and outlet to display 90 are perpendicular.

Figure 10A:
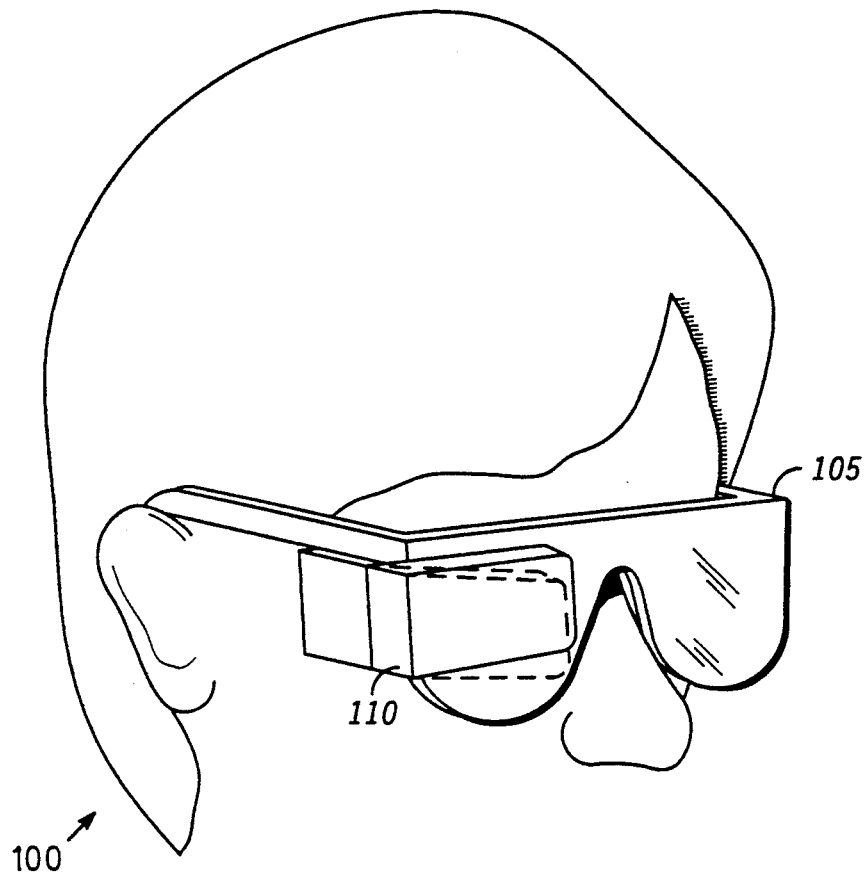
FIGS. 10A and 10B are perspective and side views, respectively, of a head mounted waveguide virtual image display embodying the present invention.
Figure 10B:
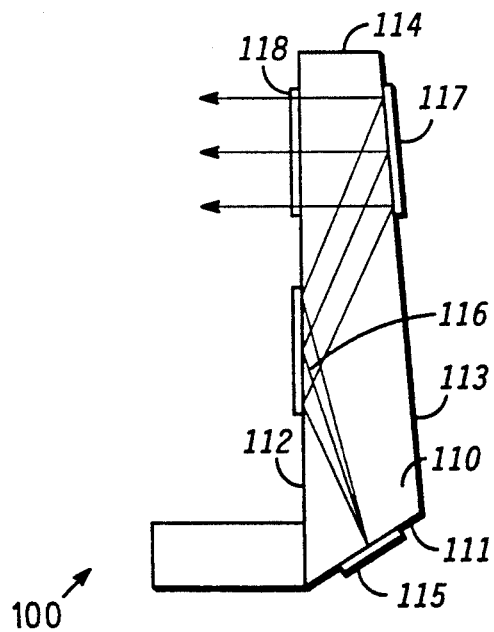

FIGS. 10A and 10B illustrate an embodiment of a waveguide virtual image display 100 wherein display 100 is incorporated into a frame 105 for eye glasses. Frame 105 provides convenient head mounting for display 100 so that hands-free viewing is accomplished. Display 100 can be any of the various embodiments discussed above and in this specific embodiment is a combination of features selected to provide the most convenient shape. Display 100 includes an optical waveguide 110 which has four sides 111, 112, 113 and 114 specifically shaped to direct light waves to predetermined areas. Apparatus 115 is affixed to side 111 of optical waveguide 110 and provides a real image, as described above, through an inlet that is generally perpendicular to side 111. Light rays travel along an optical path to a predetermined area on side 112 where a diffraction lens 116 magnifies the image and reflects the light rays to a predetermined area on side 113. A second diffraction lens 117 is affixed to side 113 at the predetermined area to provide additional magnification of the image and to direct the light rays to an outlet in side 112. A final diffractive optical element 118 is affixed to side 112 at the outlet and defines an aperture for viewing the resulting magnified virtual image. Sides 112 and 113 are designed so that light rays emanating from diffraction lens 117 are perpendicular to side 112. As is well known in the art, light rays incident to a surface, which are perpendicular to the surface, provide the most efficient transmission through the surface, so that the design of this specific embodiment is believed to be one of the simplest to construct and the most efficient to operate.

Figure 11:
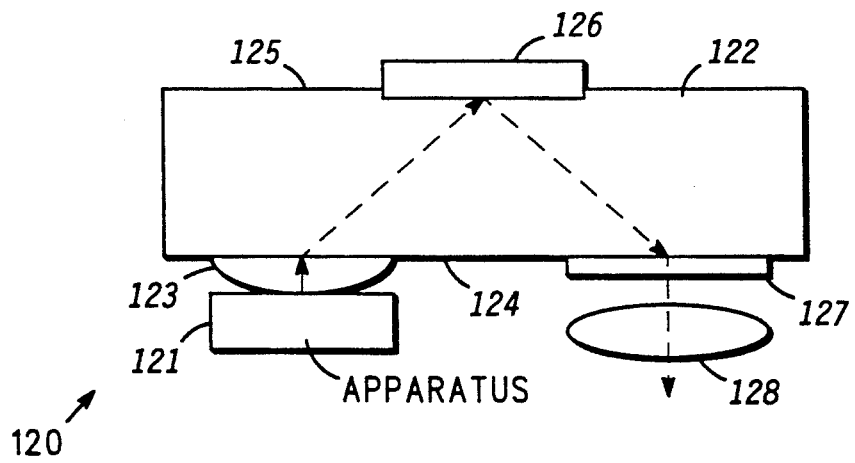
FIG. 11 is a side view of another waveguide virtual image display embodying the present invention.

Referring specifically to FIG. 11, another embodiment of a waveguide virtual image display 120 is illustrated wherein image generation apparatus 121 is positioned to provide a real image at an inlet to an optical waveguide 122 by way of a refractive lens 123. The inlet is defined on a first side 124 of optical waveguide 122 and light rays are directed, by lens 123 to a predetermined area on a second side 125 of optical waveguide 122. A diffractive lens 126 is positioned at the predetermined area on side 125 and redirects the light rays back to an outlet on side 124, defined by a diffractive lens 127. Light rays emanating from the outlet of optical waveguide 122 through diffractive lens 127 are magnified a final time by a refractive lens 128 fixedly positioned relative to diffractive lens 127. It will be understood that various combinations of diffractive and refractive optical elements can be used either internal or external to the optical waveguide to provide the required optical power, aberration correction, magnification, filtering, etc.

While a plurality of different embodiments have been illustrated and explained, it will be understood that any single embodiment can incorporate any or all of the described features. Generally, each specific embodiment should be tailored to whatever application it is desired to provide and whichever features are required should be incorporated.

Thus a new and greatly improved waveguide virtual image display is disclosed, which is used with an extremely small LED array or other real image apparatus. The waveguide virtual image display provides a predetermined amount of magnification without reducing the eye relief or the working distance of the lens system. Further, the electronics provided as a portion of the waveguide virtual image display allows a variety of very small real images to be generated, which can be easily and comfortably viewed by an operator through, for example, a head mounted, hands-free display.

While we have shown and described specific embodiments of the present invention, further modifications and improvements will occur to those skilled in the art. We desire it to be understood, therefore, that this invention is not limited to the particular forms shown and we intend in the append claims to cover all modifications that do not depart from the spirit and scope of this invention.

What is claimed is:

1. A waveguide virtual image display having a viewing aperture, the display comprising:
    image generation apparatus for providing a real image;
    an optical waveguide formed of optical quality plastic having an inlet positioned adjacent the apparatus for receiving a real image provided thereby and an outlet spaced from the inlet and defining the viewing aperture, the optical waveguide defining an optical path therethrough from the inlet to the outlet and constructed to transmit an image from the inlet to the outlet; and
    optical means positioned along the optical waveguide at predetermined areas in the optical path for magnifying a real image supplied at the inlet and providing a magnified virtual image at the outlet, the optical means including a diffractive optical element formed of a soft photopolymer film positioned at a surface of the optical waveguide.

2. A waveguide virtual image display as claimed in claim 1 wherein the optical means includes a lens formed integrally with the optical waveguide as a portion of a side of the optical waveguide.

3. A waveguide virtual image display having a viewing aperture, the display comprising:
   image generation apparatus for providing a real image;
   an optical waveguide having a real image inlet positioned adjacent the semiconductor apparatus for receiving a real image provided by the semiconductor apparatus and a virtual image outlet spaced from the real image inlet and defining the viewing aperture, the optical waveguide including a plurality of sides with the inlet positioned to direct incoming light waves angularly toward a first of the plurality of sides, resulting in a plurality of reflections between the plurality of sides, and defining an optical path through the optical waveguide from the real image inlet to the virtual image outlet, the reflections defining predetermined areas along the waveguide; and
   optical means positioned along the optical waveguide at at least some of the predetermined areas in the optical path for magnifying a real image supplied at the real image inlet and providing a magnified virtual image at the virtual image outlet, the optical means including a plurality of diffractive optical elements.

4. A waveguide virtual image display as claimed in claim 3 wherein the plurality of diffractive optical elements includes diffractive lenses.

5. A waveguide virtual image display as claimed in claim 3 wherein the plurality of diffractive optical elements includes an aberration correction element.

6. A waveguide virtual image display as claimed in claim 3 wherein the plurality of diffractive optical elements includes diffractive Fourier lenses for diffracting unwanted portions of the reflected image onto areas adjacent the predetermined areas and light absorption means positioned at areas adjacent the predetermined areas for absorbing the unwanted portions.

7. A waveguide virtual image display as claimed in claim 3 wherein the image generation apparatus includes a semiconductor chip.

8. A waveguide virtual image display having a viewing aperture, the display comprising:
   image generation apparatus for providing a real image;
   an optical waveguide having an inlet positioned adjacent the apparatus for receiving a real image provided thereby and an outlet spaced from the inlet and defining the viewing aperture, the optical waveguide defining an optical path therethrough from the inlet to the outlet and constructed to transmit an image from the inlet to the outlet; and
   optical means positioned along the optical waveguide at predetermined areas in the optical path for magnifying a real image supplied at the inlet and providing a magnified virtual image at the outlet, the optical means including a diffractive optical element.

9. A waveguide virtual image display as claimed in claim 8 wherein the diffractive optical element includes a diffractive lens.

10. A waveguide virtual image display as claimed in claim 8 wherein the diffractive optical element includes a diffractive filter.

11. A waveguide virtual image display as claimed in claim 8 wherein the apparatus providing the real image is formed in a semiconductor chip.

12. A waveguide virtual image display having a viewing aperture, the display comprising:
   image generation apparatus for providing a real image;
   an optical waveguide having a real image inlet positioned adjacent the semiconductor apparatus for receiving a real image provided by the semiconductor apparatus and a virtual image outlet spaced from the real image inlet and defining the viewing aperture, the optical waveguide including a plurality of sides with the inlet positioned to direct incoming light waves angularly toward a first of the plurality of sides, resulting in a plurality of reflections between the plurality of sides, and defining an optical path through the optical waveguide from the real image inlet to the virtual image outlet, the reflections defining predetermined areas along the waveguide; and
   optical means positioned along the optical waveguide at at least some of the predetermined areas in the optical path for magnifying a real image supplied at the real image inlet and providing a magnified virtual image at the virtual image outlet, the optical means including a refractive optical element and a diffractive optical element.

* * * * *